UNITED STATES PATENT OFFICE.

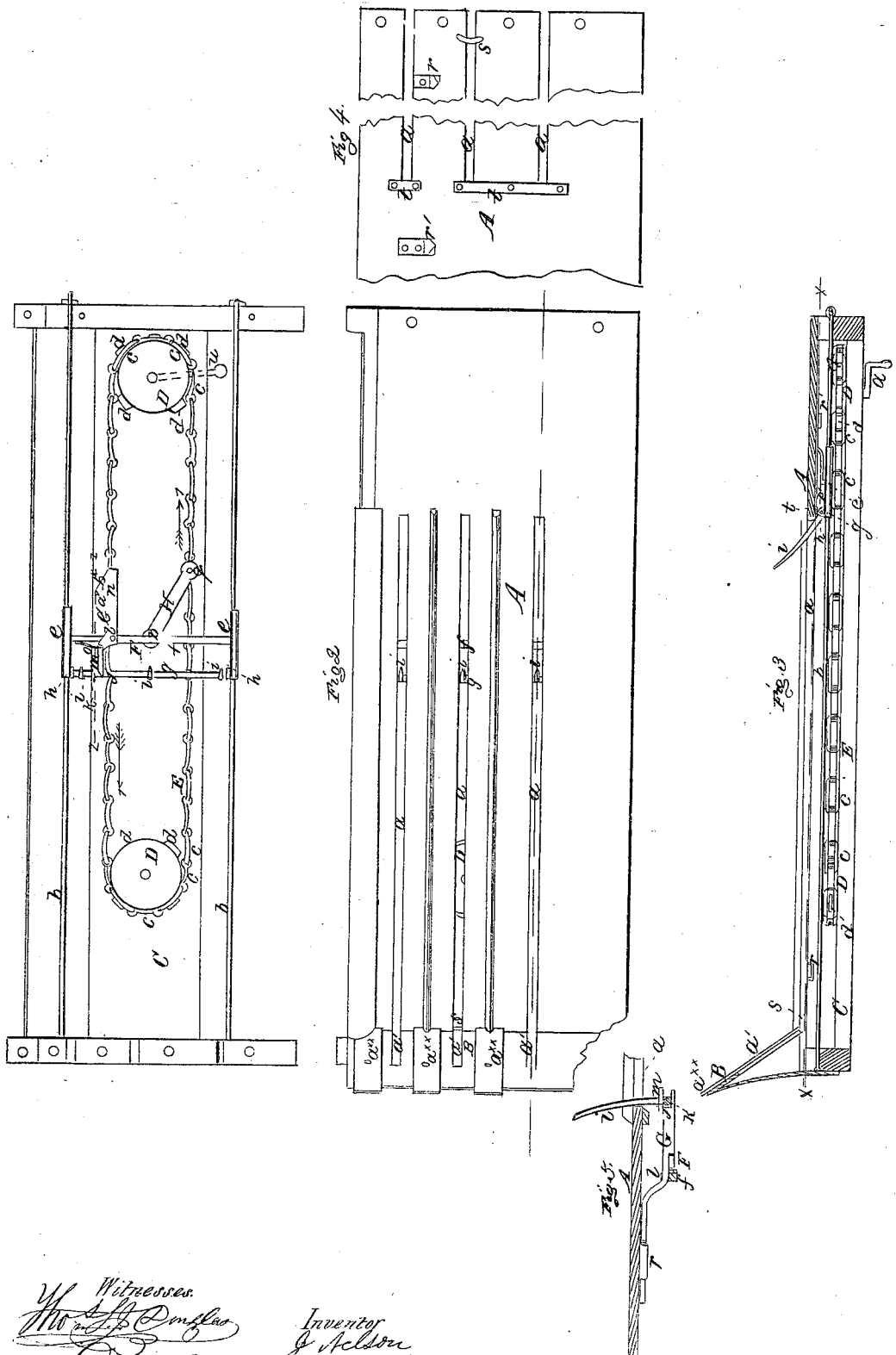

JOHN NELSON, OF ROCKFORD, ILLINOIS, ASSIGNOR TO HIMSELF AND WALES NEEDHAM, OF SAME PLACE.

IMPROVEMENT IN RAKING DEVICES FOR HARVESTERS.

Specification forming part of Letters Patent No. 41,123, dated January 5, 1864.

*To all whom it may concern:*

Be it known that I, JOHN NELSON, of Rockford, in the county of Winnebago and State of Illinois, have invented a new and Improved Automatic Raking Device for Harvesters; and I do hereby declare that the following is a full, clear, and exact description of the same, reference being had to the accompanying drawings, making a part of this specification, in which—

Figure 1 is a plan or top view of my invention applied to a harvester, the platform of the harvester being removed, as indicated by the line $x\, x$, Fig. 3, in order to show the working parts; Fig. 2, a plan or top view of the same; Fig. 3, a longitudinal vertical section of the same, taken in the line $y\, y$, Fig. 2; Fig. 4, a detached inverted plan of a portion of the platform; Fig. 5, a horizontal section of a portion of the same, taken in the line $z\, z$, Fig. 1.

Similar letters of reference indicate corresponding parts in the several figures.

To enable those skilled in the art to fully understand and construct my invention, I will proceed to describe it.

A represents a platform of a harvester, which has slots $a$ made in it longitudinally the greater portion of its length, said slots being parallel with each other, as shown in Fig. 2.

B represents an inclined plane, which is attached to one end of the platform A, and has slots $a'$ made in it which are in line with the slots $a$ of the platform and form a continuation of the latter, as shown clearly in Fig. 2. The platform A is secured upon the upper part of a shallow box, C, which extends the whole length of the platform, and has two parallel rods, $b\, b$, secured within it longitudinally and extending the whole length of the box, as shown in Figs. 1 and 3.

D D are two horizontal pulleys, which are secured to the bottom of the box C, and have an endless chain, E, fitted upon them, the links $c$ of which catch over teeth $d$ of the pulleys D, in order to prevent the slipping of the chain. (See Fig. 1.) The chain E extends nearly the whole length of the box C.

F represents a rake, which is fitted on the rods $b\, b$, and is composed of two tubes, $e\, e$, connected by a cross-rod, $f$, a tube, $e$, being fitted in each rod $b$. The tubes $e$ are allowed to slide freely on the rods $b\, b$, and said tubes have a shaft, $g$, connected to them at one end, and fitted in bearings $v$ in such a manner that the shaft is allowed to turn. This shaft $g$ has the rake-teeth $i$ attached to it, the latter being slightly curved, as shown in Figs. 3 and 5. The shaft $g$ has a square portion, $j'$, at one end of it, and in this square portion there is turned a cylindrical portion, $k$, as shown in Fig. 1. G represents a lever, which is secured to the cross-rod $f$ by means of a pivot, $l$. One end of this lever is provided with a fork, $m$, which is fitted on the shaft $g$, and the opposite end is provided with a V-shaped projection, $n$.

To the cross-rod $f$ there is attached a spring, $o$, which bears against the lever G, and has a tendency to keep the fork $m$ of the lever G over the square portion $j$ of the shaft $g$, so as to prevent said shaft from turning, as will be fully understood by referring to Fig. 5. The rake F is connected to the endless chain E by means of a link, H, one end of which is attached by a pivot, $p$, to the cross-rod $f$, and the opposite end attached by a pivot, $q$, to the endless chain. (See Fig. 1.)

To the under surface of the platform there are attached two metal plates or projections, $r\, r$, both of which are shown in Fig. 4, and there is also attached to the under side of the platform a rod, $s$, which extends across one of the slots $a$. This also is shown in Fig. 4, and to the under side of the platform, at one end of the slots $a$, there are attached metal plates or bars $t$, which are shown in Fig. 4. The axis of one of the pulleys D extends down through the bottom of the box C, and has a crank, $u$, attached to it.

The operation is as follows: As the machine is drawn along motion is communicated to the crank $u$, or to a pulley or gear-wheel on the same axis of the pulley D, by any suitable mechanism connected with the driving-wheel. The chain E is thereby rotated in the direction indicated by the arrows 1, Fig. 1, and the rake F will, in consequence of being connected to the chain E through the medium of the link H, have a reciprocating movement communicated to it. Where the rake F is moving toward the inclined plate B, as indicated by the arrow 2, the shaft $g$ is turned so that the teeth $i$ will be down and nearly in a horizontal position within the slots $a$, the teeth being held in this position in consequence of the fork $m$ of the lever G being over or on the square part $j$ of the shaft $g$. When the rake nearly reaches the termination of this movement the part or side $a^\times$ of the V-shaped projection $u$ of the lever G comes in contact with the pendent plate $r$ at the under side of the platform A, which causes the fork $m$ to be moved off from the square part $j$ of the shaft $g$, and upon the cylindrical part $k$ thereof, and the shaft $g$ being thereby liberated or left free to move. One of the teeth $i$ then catches over the rod $s$, and the teeth $i$ are all elevated when the rake F moves in the direction indicated by arrow 3, and the cut grain, during this movement of the rake, is swept off from the platform, and just before the rake reaches the termination of this movement the side $b^\times$ of the projection $u$ of the lever G will strike the pendent plate $r'$ and cause the shaft $g$ to be again released, so that the teeth $i$ will be turned down in consequence of coming in contact with the plates or bars $t$, and the rake moved in the direction of arrow 2, as before. The spring $o$, it will be understood, forces the fork $m$ of the lever G over the square part $j$ of shaft $g$ each time after the lever has been actuated to liberate the shaft. The inclined plate B serves as a cover for the rake-teeth when the latter are elevated, preventing the cut grain from interfering with this adjustment of them.

The inclined plate serves to cover the rake-teeth while the same are being turned up, and wooden strips $a^{\times\times}$, which are attached to the said plate, cause, in connection with the inclined plate B, the cut grain to fall to the base of the plate, and the rake-teeth consequently do not have to perform any labor until they are fully turned up and the square part of the shaft is caught by the lever.

In consequence of having the rake-teeth turned down, as shown—to wit, by coming in contact with the bars $t$ at the ends of the slots $a$—the teeth are drawn obliquely down from the grain, and if the latter be tangled, which is frequently the case, it will form no impediment to the free disengagement of the teeth from the grain.

Having thus described my invention, what I claim as new, and desire to secure by Letters Patent, is—

1. The endless chain E, having the rake attached to it by means of the link H, and the rake fitted on guide-rods $b\ b$, as shown, in combination with the slotted platform A, all arranged as and for the purpose specified.

2. The lever G, provided at one end with the fork $m$ and at the opposite end with the V-shaped projection $u$, in combination with the shaft $g$, having teeth $i$ attached, and the pendent plates $r\ r'$, rod $s$, and plates $t$ at the under side of the platform, all arranged as and for the purpose specified.

JOHN NELSON.

Witnesses:
WILLIAM GENT,
J. G. MANLOVE.